(12) United States Patent
Lieshout et al.

(10) Patent No.: US 8,954,066 B2
(45) Date of Patent: Feb. 10, 2015

(54) METHOD OF TRANSMITTING INFORMATION RELATED TO A MULTICAST SERVICE IN A MOBILE TELECOMMUNICATIONS NETWORK

(75) Inventors: Gert-Jan Van Lieshout, Staines (GB); Himke Van Dervelde, Staines (GB)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/089,194

(22) Filed: Mar. 24, 2005

(65) Prior Publication Data

US 2005/0232176 A1 Oct. 20, 2005

(30) Foreign Application Priority Data

Mar. 24, 2004 (GB) .................. 0406664.3

(51) Int. Cl.
*H04W 4/00* (2009.01)
*H04W 4/06* (2009.01)
*H04W 72/00* (2009.01)
*H04W 76/00* (2009.01)
*H04W 60/00* (2009.01)
*H04W 76/04* (2009.01)
*H04W 92/14* (2009.01)
*H04W 92/22* (2009.01)

(52) U.S. Cl.
CPC ............... *H04W 4/06* (2013.01); *H04W 60/00* (2013.01); *H04W 72/005* (2013.01); *H04W 76/002* (2013.01); *H04W 76/046* (2013.01); *H04W 92/14* (2013.01); *H04W 92/22* (2013.01)
USPC ........ 455/435.1; 455/560; 455/500; 455/503; 455/436; 455/438; 455/439; 370/312

(58) Field of Classification Search
USPC ............. 455/435.1, 560, 500, 503, 436, 438, 455/439; 370/312
See application file for complete search history.

(56) References Cited

U.S. PATENT DOCUMENTS

| 6,633,765 | B1 | 10/2003 | Maggenti |
| 6,889,050 | B1 * | 5/2005 | Willars et al. .............. 455/452.2 |
| 2002/0106985 | A1 | 8/2002 | Sato et al. |
| 2003/0157949 | A1 | 8/2003 | Sarkkinen et al. |
| 2004/0029616 | A1 | 2/2004 | Kim et al. |

(Continued)

FOREIGN PATENT DOCUMENTS

| CN | 1457165 | 11/2003 |
| WO | WO 2004/017580 | 2/2004 |
| WO | WO 2005/020476 | 3/2005 |

OTHER PUBLICATIONS

Friedman et al., "Multicast Session Membership Size Estimation", 1999 IEEE, pp. 965-972.*

(Continued)

*Primary Examiner* — Justin Lee
(74) *Attorney, Agent, or Firm* — The Farrell Law Firm, P.C.

(57) ABSTRACT

A method of transmitting information related to a multicast service in a Mobile Telecommunications network is provided. In one embodiment, the information related to the presence of cells in a registration area which are part of a multicast service area for the multicast service is transmitted between radio network controllers. In another embodiment, the information related to the multicast service one or more user terminals have joined is stored in a radio network controller while the user terminal has joined said one or more multicast services.

6 Claims, 4 Drawing Sheets

(56) References Cited

U.S. PATENT DOCUMENTS

| | | | |
|---|---|---|---|
| 2004/0057387 A1* | 3/2004 | Yi et al. | 370/252 |
| 2004/0137885 A1* | 7/2004 | Sarkkinen et al. | 455/414.1 |
| 2004/0147266 A1* | 7/2004 | Hwang et al. | 455/445 |
| 2004/0152473 A1* | 8/2004 | Kuwano et al. | 455/456.2 |
| 2004/0157640 A1* | 8/2004 | Pirskanen et al. | 455/552.1 |
| 2004/0209624 A1* | 10/2004 | Rune et al. | 455/453 |
| 2005/0213541 A1* | 9/2005 | Jung et al. | 370/331 |
| 2006/0025162 A1* | 2/2006 | Cao et al. | 455/466 |
| 2006/0106865 A1* | 5/2006 | Beming et al. | 707/104.1 |
| 2007/0287392 A1* | 12/2007 | Sagne et al. | 455/119 |
| 2008/0064429 A1* | 3/2008 | Park | 455/503 |

OTHER PUBLICATIONS

Sagne et al., Mobility Handling, Feb. 11, 2004, International Application Publication WO/2005/079101, first page.*

Samsung, "MBMS Common Paging Versus MBMS Dedicated Paging", Jan. 2004.

"Universal Mobile Telecommunications System (UMTS); Introduction of Multimedia Broadcast/Mulitcast Service (MBMS) in the Radio Access Network (RAN); Stage 2", ETSI TS 125 346 V6.3.0, Dec. 2004.

Ericsson: "Handling of UEs in CELL_PCH and URA_PCH", 3GPP TSG-RAN2 Meeting #41, Feb. 12-16, 2004.

Alouf et al., "Optimal On-Line Estimation of the Size of a Dynamic Multicast Group", 2002 IEEE, pp. 1109-1118.

Vodafone Group: "Requirements for Responding to MBMS Notification for UEs in URA_PCH", TSG-RAN Working Group 2 Meeting #40, Jan. 12-16, 2004.

Vodafone Group: "Tracking and MBMS Bearer Establishment for UEs in URA_PCH", 3GPP TSG RAN WG2#41, Feb. 16-20, 2004.

Ericsson, Iur linking—URA_PCH/CELL_PCH, 3GPP TSG-RAN3 Meeting #41, Feb. 20, 2004.

* cited by examiner

METHOD OF TRANSMITTING INFORMATION RELATED TO A MULTICAST SERVICE IN A MOBILE TELECOMMUNICATIONS NETWORK

BACKGROUND OF THE INVENTION

1. Field of the Invention

This invention relates to a broadcast or multicast service in a telecommunications system. More explicitly, but not exclusively, the invention relates to the realisation of a Multicast Broadcast services in a radio access network (RAN) such as in the Universal Mobile Telecommunications Service (UMTS) radio access network. UMTS concerns a third generation radio network using wideband code division multiple access (W-CDMA) technology.

2. Description of the Related Art

A cellular communications system includes a mobile user equipment (UE) 1, an UMTS Terrestrial Radio Access Network (UTRAN) 3 and a core networks (CN) 5, as illustrated in FIG. 1 for the UMTS case. A detailed overview over the architecture of a cellular telecommunications system of the third generation may be found in the 3GPP specification "UTRAN Overall Description" 3GPP TS25.401 and related specifications. Communication between the UE 1 and the UTRAN 3 is provided via the Uu interface (Uu), whereas the communication between the UTRAN 3 and the core network 5 is done via the Iu interface (Iu).

A radio access network includes base stations and radio network controllers or base station controllers (RNC/BSC). The base stations handle the actual communication across the radio interface, covering a specific geographical area also referred to as a cell. The radio network controllers control the base stations connected to it, but in addition perform other functionality like for example the allocation of radio resources and the control of local mobility. An RNC connects to one or more core networks via the Iu interface, to a number of base stations (node B's for the case of UTRAN) via the Iub interface and possibly to one or more other RNCs via the Iur interface. The core network includes a serving GPRS (General Packet Radio Service) support node (SGSN) and a broadcast/multicast—service centre (BM-SC). The BM-SC controls the distribution of the data related to MBMS service(s).

Communications Networks of the third generation (3G) such as the UMTS network provide Multimedia Broadcast Multicast Services (MBMS). MBMS is a point-to-multipoint service in which multimedia data such as audio, images or video data is transmitted from a single source entity to multiple recipients by using an unidirectional bearer service. The MBMS bearer service offers both a broadcast mode and a multicast mode. In the broadcast mode, the data are broadcasted to all users. In contrast, a user needs to subscribe to a particular MBMS service or a group of MBMS services with a service provider in order to receive multicast services. The operator may then announce the service or use a service discovery mechanism to inform users about the range of MBMS services available. If the user is interested in a particular MBMS service, the user joins the service, i.e. the user activates the MBMS multicast service. In this way the user becomes a member of a particular multicast group and indicates to the network that he or she wants to receive the MBMS data of a particular MBMS service.

The area in which a specific multicast MBMS Bearer Service is available is referred to as the MBMS Service Area, or the MBMS Multicast (MC)-service area. It is defined individually per MBMS Bearer Service, i.e. the MBMS service area is MBMS service specific. Such a MBMS service area consists of a number of cells. An MBMS MC-service area might not have any relation to other area of the network, such as the UTRAN Registration Areas (URA's), Routing Areas (RAs) or Location Areas (LAs). Thus, an MBMS MC-service area may consist of some cells of a URA, RA or LA, without necessarily including all cells of that URA, RA or LA.

More information regarding MBMS realisation in the UTRAN may be found in the corresponding stage-2 document "Introduction of Multimedia Broadcast Multicast Service (MBMS) in the Radio Access Network (RAN)", TS 25.346.v2.6.0.

Transmitting the same data to multiple recipients allows network resources to be shared. In this way the MBMS architecture is designed to enable an efficient usage of radio-network and core-network resources.

In order to initiate a MBMS session, the CN sends a session start command to the RNC. The Session Start command is used to indicate that the core network is ready to send data relating to a particular MBMS service. The Session Start command triggers the establishment of a bearer resource for MBMS data transfer. It is noted that the Session Start occurs independently of activation of the service by the user. This means that a user may activate a particular service either before or after a Session Start.

After receiving the Session Start command, the RNC send MBMS notifications to the UE in order to inform the UEs about forthcoming or even ongoing MBMS multicast data transfers. The RNC manages the use of the radio resources and decides whether the MBMS data will be transmitted using point to multipoint or point-to-point transfer mode on the radio interface. If there are sufficient UEs in a cell, the point-to-multipoint transfer mode is most efficient. If however the number of users in a cell is low, the point-to-point transfer mode may be most efficient. To decide which transfer mode to use, the RNC may perform a counting operation. Subsequently multimedia data relating to a particular MBMS service are transmitted from the CN via the RNC to the UEs during the data transfer phase.

When the BM-SC determines that there will be no more data to send, the CN sends a Session Stop command to the RNC and the bearer resources are released If a user is no longer interested in a particular MBMS service, the user deactivates the service. Accordingly, the user leaves the multicast group if he or does no longer want to receive Multicast mode data of a specific MBMS bearer service.

It is noted that the phase subscription, joining and leaving are performed individually per user. The other phases, such as the notification and the data transfer, are performed for a particular service, i.e. for all users interested in the related service.

As of 3GPP RAN2 meeting number 41 (16-20 Feb. 2004), the situation regarding how MBMS will be handled on the Uu interface has again become clearer. The current status of MBMS realisation in RAN2 is described in 3GPP specification TS25.401.

Although several contributions have already been submitted to RAN2 related to how to handle UEs in URA_PCH/CELL_PCH states in combination with MBMS reception, see for example:

document R2-040068: "MBMS Common Paging versus MBMS Dedicated Paging Samsung", available from http://www.3gpp.org/ftp/tsg_ran/WG2_RL2/TSGR2_40/Docs;

document R2-040087: "Requirements for responding to MBMS Notification for UEs in URA_PCH Vodafone Group", available from http://www.3gpp.org/ftp/tsg_ran/WG2_RL2/TSGR2_40/Docs;

document R2-040505: "Handling of Ues in CELL_PCH and URA_PCH Ericsson", available from http://www.3gpp.org/ftp/tsg_ran/WG2_RL2/TSGR2_41/Docs; and document R2-040532: "Tracking and MBMS bearer establishment for UEs in URA_PCH Vodafone Group", available from http://www.3gpp.org/ftp/tsg_ran/WG2_RL2/TSGR2_41/Docs.

It is an aim of the present invention to improve the method and system described above.

A terminal having an RRC connection is referred to as an RRC connected UE, whereas a terminal with no RRC connection established is referred to as a UE in idle mode. A terminal in RRC connected mode can be classified into the CELL_PCH (Cell—Paging Channel), URA_PCH, CELL_FACH (Cell—Forward Access Channel) and CELL_DCH (Cell—Dedicated Channel) states, depending on the channels the UE can currently receive.

For a terminal in the CELL_DCH state, a dedicated logical channel and a transport channel related to DCH are established, and data on the DCH can always be received. For a terminal in the CELL_FACH state, a dedicated logical channel and a transport channel related to FACH are established and the FACH data can always be received, but the DCH and the DSCH (Downlink Shared Channel) cannot be received. For a terminal in the CELL_PCH or the URA_PCH state, a dedicated logical channel has not been established. However, a paging message can be received via the PCH or a cell broadcast service (CBS) message can be received via the FACH.

SUMMARY OF THE INVENTION

According to one embodiment of the present invention, there is provided a method of providing information related to a multicast service in a mobile telecommunications network, wherein information related to the multicast service one or more user terminals have joined is stored in a radio network controller while the user terminal has joined said one or more multicast services.

Another aspect is the handling of UEs in the URA_PCH state in relation to MBMS.

In this application a solution is described which allows to support point-to-multipoint (ptm) MBMS radio bearer (RB) reception in URA_PCH state.

However, since the UTRAN is not informed about the mobility of the UE in a URA in URA_PCH state, this type of solution implies that the network has to provide consistent service availability information in all cells across the URA. In this way this solution is considerably different to the first approach.

In references R2-040087 and R2-040532 some aspects of the second approach are discussed. However, both papers do not describe the problem of having to indicate the service availability correctly in the whole URA.

Reference R2-040505 proposes to handle CELL_PCH and URA_PCH in the same manner. However, the problem of providing consistent service availability in the whole URA is not discussed According to another aspect of the present invention, there is provided a method of transmitting information related to a multicast service in a mobile telecommunications network, wherein information related to the presence of cells in a registration area which are part of a multicast service area for said multicast service is transmitted between radio network controllers.

According to another aspect of the present invention, there is provided a method of providing a multicast service in a mobile telecommunications network, wherein a first radio network controller keeps information related to mobile terminals in a particular state within a registration area which are interested in one or more multicast services.

The alternative approach to support ptm MBMS RB reception in URA_PCH state, is described in the 3GPP specification TS 25.423 v6.4.0 (see section 8.2.2.2). However, the specification is unclear about how the counting procedure is carried out to decide whether the MBMS service is distributed in ptp or ptm mode.

As has been described above the counting or recounting procedure used for UEs in RRC-Idle state is carried out using a probability factor which requires a certain percentage of the UE to wake up out of the RRC-Idle state to respond to the counting request. After the number of responding UEs has been determined, it is then decided whether the MBMS service is distributed in the ptp or ptm mode.

In the document R2-040532 it is proposed that the same probability factor as is used for UEs in RRC_Idle mode is also used for UEs in URA_PCH state.

When an RRC-Idle mode UE needs to be counted, it will transit from RRC_Idle state to RRC-Connected state in order to respond to the counting request. On the other hand, when a UE in the URA_PCH state needs to be counted, it has to perform a cell update procedure.

However, it is usually simpler and quicker to bring a UE from the URA_PCH state to any other RRC-connected state using a cell update procedure, than to bring a UE in an RRC-Idle mode to RRC-Connected state using an RRC connection establishment procedure. Therefore, the solution proposed in R2-040532 appears not to be a very efficient solution.

According to another aspect of the present invention, there is provided a method of providing a multicast service in a mobile telecommunications network, wherein counting of user terminals in RRC-idle state and/or URA_PCH state interested in a particular multicast service is performed using a first and a second probability factors, respectively, and wherein said first probability factor is different to said second probability factor.

According to yet another aspect of the present invention, there is provided a method of providing a multicast service in a mobile telecommunications network, wherein counting of user terminals interested in a particular multicast service is performed using a probability factor and an additional parameter.

BRIEF DESCRIPTION OF THE DRAWINGS

Embodiments of the present invention will now be described, by example only, with reference to the accompanying figures, whereby.

DETAILED DESCRIPTION OF THE PREFERRED EMBODIMENTS

Figure 1:
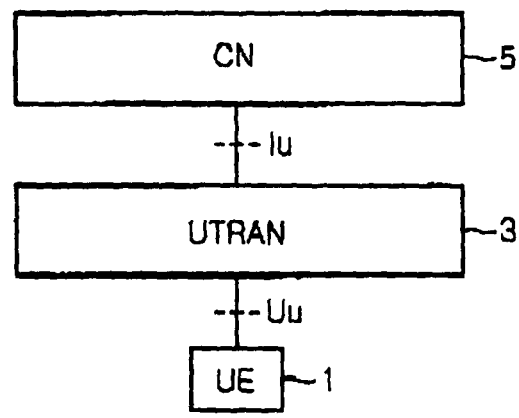
FIGS. 1 and 2 are schematic outlines of a mobile communications network, in which the present invention can be incorporated.
Figure 2:
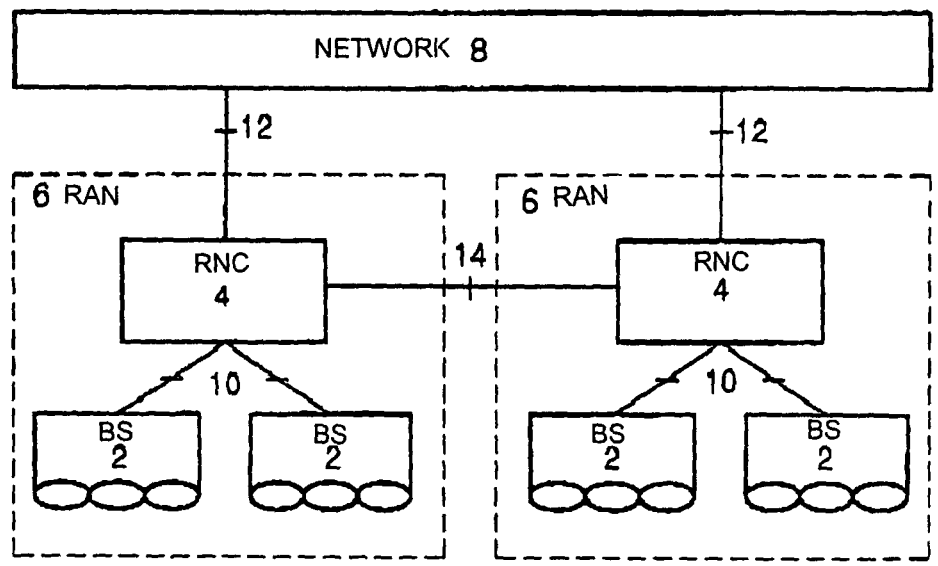

FIG. 2 illustrates the architecture of a radio access network. The RAN 6 comprises base stations 2, such as the so-called Node B's for the UTRAN, and radio network controllers 4 (RNC), also referred to as base station controllers (BSC). The base stations 2 handle the actual communication across the radio interface, covering a specific geographical area also referred to as a cell. The RNCs 4 control the base stations 2 connected to it, and also include other functionality for tasks such as the allocation of radio resources, i.e. the local mobility. The RNCs 4 are connected to one or more core networks 8 via the Iu interface 12, to a number of the base stations 2 via the Iub interface 10 and possibly to one or more other RNCs 4 via the Iur interface 14.

In a UMTS network, the Radio Resource Control (RRC) protocol is used across the radio interface, i.e. between a UE and a UTRAN. These protocol end points interact by exchanging protocol parameters, by sending messages comprising of one or more information elements.

In order to set up a MBMS session, a RNC receives a respective request from a CN. This MBMS Session Start Request contains a MBMS Service Identification, specifies the MBMS Bearer Service Type and MBMS Session Attributes such as the MBMS Service Area Information or Quality of Service parameters. After the RNC receives the MBMS Session Start Request, it notifies UEs which are interested in and have activated the particular MBMS service.

The MBMS Session Start Request contains all information necessary to set up an MBMS Radio Access Bearer (RAB). Upon reception of the Session Start message, the RNC executes an MBMS data bearer set up over the Iu interface, and subsequently informs the sending CN of the outcome of the set up in a MBMS Session Start response message.

For a particular MBMS service, data is then transferred via an MBMS RAB between the radio access network and the UE.

In order to set up the connections between the RNC and the UE, the existing transport channel mechanism of the Forward Access Channel (FACH) over Iub is used in case of a point-to-multipoint (ptm) MBMS transmission. A ptm connection is established if the number of counted MBMS users in a cell exceeds a certain operator-defined threshold. Otherwise, a point-to-point (ptp) connection is established over the DTCH (Dedicated Transport Channel) as defined for other dedicated services.

The CN sends an MBMS Session Stop command in a similar way to the RNC, and the RNC then notifies the interested and activated UEs of the end of the MBMS session. When the RNC receives the MBMS Session Stop command, it releases the associated MBMS RAB resource.

Figure 3:
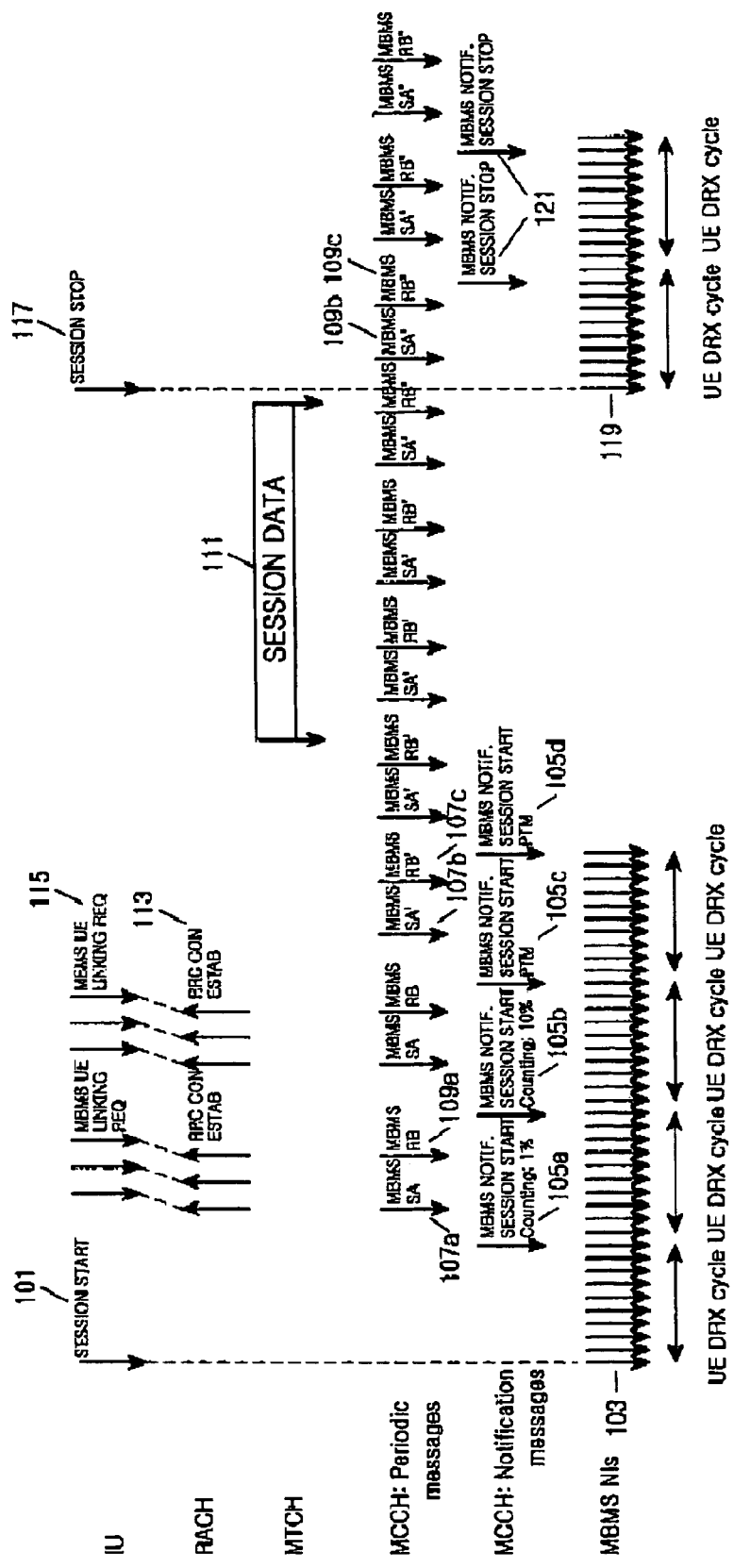
FIG. 3 is a schematic illustration of a messaging timeline of a MBMS session.

Referring now to FIG. 3, the sequence of main events that take place during a MBMS session is described. More details may be found in the 3GPP specification TS 25.346. The session is started when a SESSION START message 101 is received by the UTRAN over Iu, and terminated when the SESSION STOP message 107 is received over Iu.

After the SESSION START message 101, the UTRAN sends out MBMS notification indicators (NI's) 103 in order to wake-up UE's in RRC_Idle, CELL_PCH, URA_PCH and CELL_FACH states. The MBMS notification indicators 103 are sent on the MBMS notification Indicator channel (MICH). UE's only need to wake-up and look for the MBMS NI's 103 at their normal paging occasions, i.e. the paging occasion for the normal UE DRX (Discontinuous Receive) cycle used for conventional (R99) paging. As a result, the MBMS notification indicators 103 sent by the network have to be repeated continuously during one or more UE DRX cycles.

If a UE detects that an MBMS NI 103 is set for an MBMS service in which it is interested, the UE listens to the MBMS point-to-multipoint Control Channel (MCCH). It has been agreed that transmissions on MCCH will be scheduled, although this is not specifically described in the 3GPP specification 25.346. Thus, all UEs receiving the MBMS NIs 103 during a certain specified period will all listen to the MCCH at one specific instance, in this document referred to as the MCCH notification occasion. The specified period is typically the largest UE DRX cycle. It is assumed that the MCCH notification occasion configuration is broadcast on BCCH or MCCH.

The message sent every DRX cycle at the MCCH notification occasion is the MBMS NOTIFICATION message 105a/b/c/d. This message 105 will at session start typically first trigger a counting procedure by indicating that a certain percentage, the so-called "counting probability", of UEs interested in the session being started should respond by establishing an RRC connection. It is noted that the MBMS Notification message has not yet been described in 3GPP specification 25.346.

After the UE receives the MBMS notification message 105a, it sends a request 113 to establish an RRC connection to the core network to allow for the counting process. The request 113 includes a Service identification (ID), which identifies the MBMS service the UE is interested in. As a response, the CN identifies the MBMS service the UE is interested in and sends a MBMS Linking Request Message 115 over the Iu interface.

As soon as the UEs receive an "interesting" MBMS NI 103, the UE shall listen to the MCCH at the MCCH notification occasions. An "interesting" MBMS NI in this respect means that the NI relates to any of the MBMS services the UE has joined. After the first MBMS Notification message 105a has been sent, the one or more subsequent MBMS Notification messages 105b/c/d may contain different counting probabilities. In this way the UTRAN determines whether the MBMS service should be provided by point-to-point or point-to-multipoint (ptp/ptm). By having higher counting probability at subsequent counting cycles, the UTRAN is able to obtain a gradual idea about how many UEs in the cell are interested in a specific MBMS service, and can then decide whether the MBMS service shall be provided ptp or ptm.

When the UTRAN has taken the ptp/ptm decision, the counting process will be stopped. In case ptp is selected, the interested UE's will receive a RADIO BEARER SETUP message. FIG. 3 illustrates the case that the service is provided by ptm. In this case the UTRAN configures the MBMS point-to-multipoint Traffic Channel (MTCH) and updates the MCCH by sending the MBMS SERVICE INFORMATION message 107a/b/c and MBMS RADIO BEARER INFORMATION message 109a/b/c. The two messages 107,109 include the service identification and radio bearer information for the MBMS service.

After the UE has read the MBMS SERVICE INFORMATION messages 107a/b/c and MBMS RADIO BEARER INFORMATION messages 109a, it is able to read the MBMS data transmissions 111 on the corresponding MTCH.

When transmission of the MBMS session is finalised and the SESSION STOP message 117 is received over Iu, the UE will be informed about the session stop by a RADIO BEARER RELEASE message in case of ptp or a SESSION STOP notification message 121 for ptm transmission. In order to ensure that all UEs detect the SESSION STOP notification, the UTRAN send again MBMS NIs 119, such that the interested UE listens to the MCCH.

Handling of CELL_PCH State UEs

One issue which has to be solved is how UEs in CELL_PCH state are to be handled if MBMS reception is to be envisaged.

In the following two solutions are proposed which allow to reduce the signalling, particularly between the serving radio network controller (SRNC) and the drift radio network controller (DRNC).

Solution 1

The signalling involved in providing a MBMS service can be significantly reduced if the DRNC stores information about which of the UEs have joined a particular MBMS service. In this way the SRNC does not have to submit this information to the DRNC if one of the UEs change from one cell to another cell within the DRNC.

When, for example one of the UEs served by a DRNC moves to another cell within the DRNC, the DRNC will be able to correctly count the number of UEs in CELL_PCH state which are interested in a specific service by using the information stored.

For example, if a UE in CELL_PCH state which is interested in two different MBMS services, denoted as MBMS service 5 and MBMS service 10, moves from cell 1 to cell 2 under a DRNC, the DRNC subtracts 1 from the number of interested UEs interested in services 5 and 10 in cell 1, and adds 1 to the number of interested UEs for MBMS services 5 and 10 in cell 2. In this way the DRNC is always informed about the number of UEs in CELL_PCH state interested in the different MBMS services without the SRNC being required to inform the DRNC about every change from one cell to another Proposals so far for the handing of CELL_PCH UEs with respect to MBMS reception seem to assume the usage of a new type of context (e.g. "MBMS-context") for storing MBMS information related to UEs in CELL_PCH state.

The above described solution can thus be implemented into this MBMS-context. This means that the information about the number of UEs in CELL_PCH state which are interested in the different MBMS services is stored in this MBMS-context.

Solution 2

Another way of implementing the above described solution of storing information about the UEs in CELL_PCH state in the DRNC is to use a so-called UE-context rather than a MBMS-context Such a UE-context has been described in particular for UEs in CELL_DCH or CELL_FACH state. When a UE is in CELL_DCH or CELL_FACH state under a DRNC, the DRNC will have a UE-specific context for storing all UE specific information, such as the Uu channel configuration, or the radio network temporary identities (RNTI).

Although it is probably not common to have a UE-context in a DRNC for a UE in CELL_PCH state, already from R99 the SRNC can require the DRNC to maintain a UE-context also for CELL_PCH state UEs.

Having a UE-context in the DRNC for CELL_PCH UE's allows the DRNC to store information with respect to MBMS services the LE has joined and the SRNC will not have to inform the DRNC about this information at every cell change.

It is noted that the SRNC may require the DRNC to have a UE-context for a UE in CELL_PCH while the UE has joined one or more MBMS services and one or more of these services has a session ongoing.

Alternatively, the SRNC may request the DRNC in addition to have a UE-context for a UE in CELL_PCH state while the LE has joined one or more MBMS services even if none of these services has a session ongoing.

The advantages of solution 2 compared to solution 1 is that by using the existing UE-context, creation of additional contexts in the DRNC for CELL_PCH state UEs is prevented; and that by using the existing UE-context, existing R99 signalling can be re-used. If for example a UE moves to from a first to a second RNC, the existing COMMON TRANSPORT CHANNEL RESOURCE RELEASE request can be used to inform the DRNC about the change. The DRNC can then adjust the number of UEs interested in a particular service accordingly.

Support PTM MBMS RB Reception in URA_PCH State

Currently it is envisaged that UEs can receive a PTM MBMS RB in RRC-Idle state, as well as in states where the LE is located up to cell level. What are the implications of enabling PTM MBMS RB reception by UEs in URA_PCH state as well?

When an RRC-Idle mode UE moves within a certain RA, it will not perform any RA updates (RAUs). As a result, when such a UE enters a particular RA, the network needs to ensure that all cells which are part of the RA need to transmit consistent information regarding whether an MBMS service is available or not in that cell, i.e. whether the cell is part of the multicast service area or not.

For UEs in RRC-Idle mode, keeping the information consistent across all cells in the RA is responsibility which is shared between the CN and UTRAN.

The CN sends a SESSION START to all RNC's, which are part of the RA, and the UTRAN updates the MBMS service availability in all cells which are part of the RA and are part of the multicast area.

An approach similar to the RRC-Idle approach will be needed for UE's in URA_PCH state which do not perform any URA-updates when moving within the URA. Therefore the network needs to ensure that all cells which are part of the URA need to transmit consistent information regarding whether an MBMS service is available or not in that cell.

Since the CN does not know about URAs, keeping the information consistent across all cells in a URA is the responsibility of the UTRAN, and can be achieved in the following way.

When the UE enters a URA, the serving RNC (SRNC) sends a message to all drift RNCs (DRNCs) which handle cells which are part of the URA. With this message, the SRNC requests the DRNC to provide correct service availability information in all cells of the URA for one or more services. This message is referred to as URA-ATTACH message in the following.

When the DRNC has received at least one URA_ATTACH message for a cell in the DRNS, it has to make sure it will receive the SESSION START message for this MBMS service, and provide the correct MBMS service availability during the session on the MCCH.

When the UE leaves the URA, or leaves the URA_PCH state, the SRNC can indicate the end of the requirement by using another message to all DRNCs which handle cells which are part of this URA. This message is referred to as "URA-DETACH" message in the following.

The SRNC updates its request to the DRNC whenever a first UE (from an SRNC point of view) which has joined a specific MBMS service enters the URA in URA_PCH state; or when a last UE (again from an SRNC point of view) which has joined a specific MBMS service leaves the URA in URA_PCH state.

It is noted that entering/leaving the URA can be due to mobility (e.g. a UE in URA_PCH state moving into a new URA) as well as due to a state transition (e.g. a UE already present in cells belonging to a certain URA in CELL_DCH state, now transiting to URA_PCH state).

The DRNC will accumulate the requests from the different SRNCs (including itself) and if at least one SRNC wants the MBMS service availability information in a certain URA, the DRNC shall provide the information across Uu.

Figure 4:
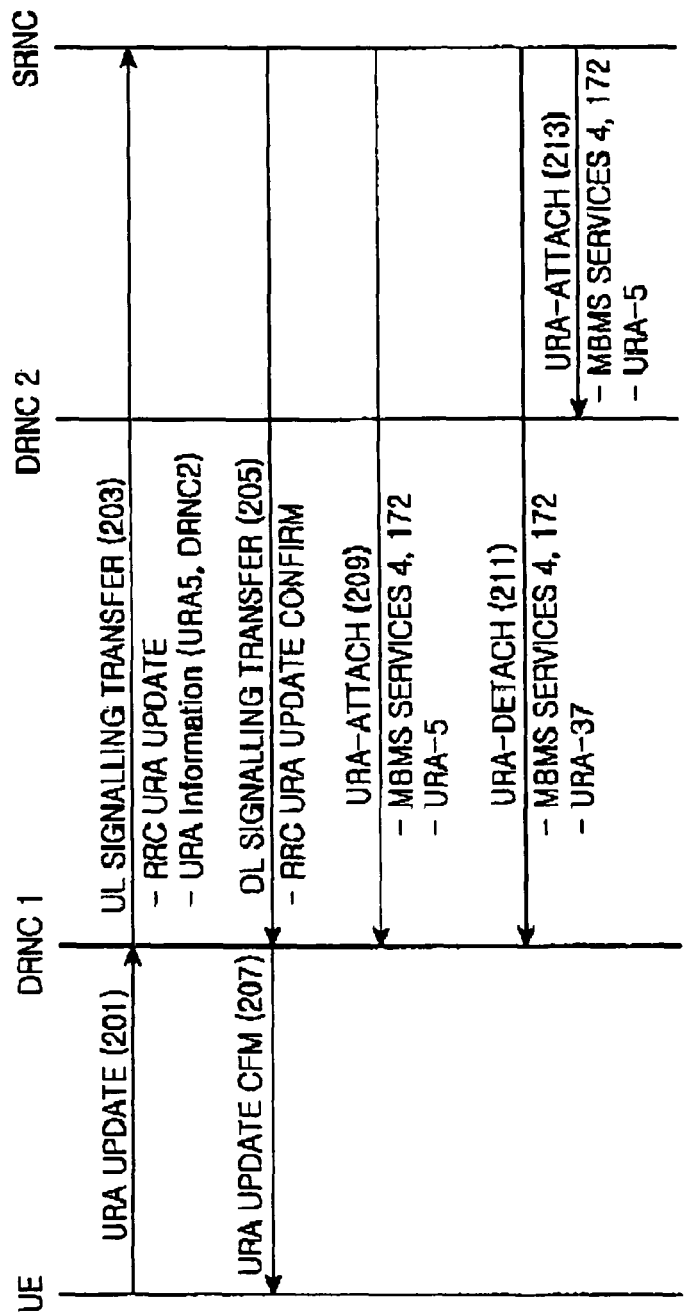
FIG. 4 is a schematic diagram illustrating signalling sequences according to one embodiment of the present invention.

Referring now to FIG. 4, a signalling sequence is shown to illustrate this embodiment of the present invention.

Consider a UE which is interested in two different MBMS services, denoted as MBMS services 4 and 172 in the following. This UE now moves from a first URA (URA-37) to another URA (URA-5) under the control of a DRNC (DRNC1). Both DRNC1 and DRNC2 have cells belonging to URA-5.

In step 201 the UE sends a URA UPDATE message to the DRNC1, and the DRNC1 sends a uplink (UL) signalling transfer message to the SRNC, including a RRC URA UPDATE message and URA information, specifying the UE moved to URA-5 under the control of DRNC2 (step 203). The SRNC then send back a downlink (DL) signalling transfer message to DRNC 1, confirming the RRC URA UPDATE (step 205). In step 207 the DRNC1 sends an URA UPDATE confirmation message to the UE.

In addition to the above described normal signalling required for handling the URA update procedure, the SRNC also informs DRNC 1 that from now on the service availability for MBMS services 4 and 172 shall be signalled correctly in URA-5, by transmitting URA-ATTACH message to DRNC 1 (step 209). In addition, the availability signalling for MBMS services 4 and 172 is no longer required in URA-37, and the SRNC sends an URA-DETACH message to the DRNC1 including this information (step 211).

Since URA-5 spans two RNCs, also DRNC2 is informed about the request to keep the service availability information for MBMS Services 4 and 172 accurate in URA-5 in an URA-ATTACH message (step 213).

It is noted that for efficiency reasons, several of the flows shown above might be combined in one message.

At a first glance it might appear as if the new functionality adds a lot of additional signalling. However, taking into account the following aspects, the additional signalling is limited.

An update of the URA-ATTACH information is only required when the first UE of an SRNC enters the URA in the DRNC, or the last UE of an SRNC leaves the URA. Thus, and URA-ATTACH message is not required for every UE entering a URA.

Several of the information flows in the above example may be combined in one message.

In the typical case of mobility within the SRNC in which the URAs are confined to one RNC only, the requirement of having consistent service availability signalling across a URA will not cause any significant signalling load.

By providing additional signalling over Iur in the way described above, the network is enabled to provide consistent MBMS service availability in all cells of a URA, thus enabling PTM MBMS RB reception in URA_PCH state.

In the above described embodiment "common signalling" (i.e. not UE specific signalling) is used over Iur. In this way the signalling load over Iur is reduced compared to solution using "dedicated signalling" (i.e. UE specific signalling).

By enabling the UE to stay in URA_PCH state while receiving a PTM MBMS RB transmission the impact on existing R99-R5 RRM procedures is limited, and additional UE power consumption, which would be required in other RRC-Connected states, is prevented.

Counting Procedure for UEs in URA_PCH State

Below there are two alternative solutions proposed to improve the counting procedure for UEs in the URA_PCH state.

Solution 1

One possibility is to use a separate probability factor for URA_PCH state UE. This probability is different to the probability factor for UEs in RRC_Idle state. In this way the probability factor for UEs in URA_PCH state can be chosen to be, for example, greater than the probability factor for UEs in RRC_Idle state.

In this way the solution provides added flexibility in deciding which percentage of UEs in the different states (RRC-Idle or URA_PCH) are to be counted or recounted.

Figure 5A:
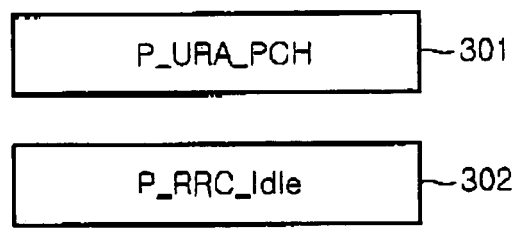
FIGS. 5A and 5B are schematic illustrations of probability factor signalling according to two embodiments of the present invention.

FIG. 5A illustrates the use of two separate probability factors. The signalling message part 301 and 302 include the probability factors for UEs in URA_PCH and RRC_Idle state, respectively. If the counting process for UEs in URA_PCH state is carried out, the UTRAN signals to the UE the probability factor p_URA_PCH, so that the signalled percentage as determined by this probability factor 301 of the UEs in URA_PCH state respond to the request. If, on the other hand, the counting process for UEs in RRC_Idle state is carried out, the UTRAN network signals to the UE the probability factor p_RRC_Idle, so that the signalled percentage as determined by probability factor 302 of the UEs in RRC_Idle state respond to the request.

Solution 2

An alternative solution is to use only one probability factor to determined which percentage of UEs are to be counted, and this probability factor appies both to UEs in the RRC_Idle mode and URA_PCH state. However, the RRC_Idle mode UEs are not counted on every instance the URA_PCH state UEs are counted, but at every instance the URA_PCH state UEs are counted, the RRC_Idle mode UEs are also counted.

This solution considers the fact that it is easier to bring URA_PCH UEs to another RRC-Connected mode state, than to bring RRC-Idle mode UEs to RRC-Connected state.

This solution can for example be implemented by adding a 1-bit flag to the probability factor when signalling it over the Uu interface to the UE: This flag specifies the states for which the counting procedure is carried out. The flag distinguished between two possibilities, referred to as "URA-PCH" and "RRC_Idle" in the following.

If the flag indicates "URA-PCH", the counting procedure is only carried out for UEs in the URA_PCH mode. For these UEs the signalled probability factor applies. UEs in RRC_Idle mode are not required to establish an RRC_Connection in relation to the counting, i.e. the probability factor in this case does not apply to UEs currently in RRC_Idle state.

If the flag indicates "RRC-Idle", all UE's in URA_PCH state that have joined the MBMS service are required to establish an RRC connection in order to respond to the counting request. In addition, the probability factor is also applicable to UEs in RRC-Idle state, and these UEs are also requested to move to an RRC_Connected state.

Figure 5B:

FIG. 5B illustrates a message from the UTRAN network to the UE including a common probability factor 311 and a flag 312.

The advantage of solution 2 compared to solution 1 is that the additional signalling over Uu can be reduced, as solution 1 requires the signalling of two probability factors rather than only one. Instead, for solution 2 only an additional 1-bit flag or the like needs to be signalled to the UE. At the same time the counting procedure can be significantly improved compared to the solution described in the prior art.

Thus, solution 2 provides most of the functionality provided by solution 1 when one assumes that RRC-Idle mode UEs are only requested to go to RRC-Connected mode in case all URA-PCH UEs have been counted. Solution 2 is more efficient from a signalling point of view, and is still assumed to provide sufficient flexibility.

The advantage of solution 1 is that it provides the greatest flexibility for the counting procedure.

It is to be understood that the embodiments described above are preferred embodiments only. Namely, various features may be omitted, modified or substituted by equivalents without departing from the scope of the present invention, which is defined in the accompanying claims.

What is claimed is:

1. A method of transmitting information related to a multicast service in a mobile telecommunications network, the method comprising:
   determining whether the network supports multicast service reception for a user terminal in a UMTS Terrestrial Radio Access Network (UTRAN) Registration Area Paging Channel (URA_PCH) state;
   transmitting ATTACH messages from a serving radio network controller to all drift radio network controllers having cells in a registration area in which the user terminal is present, the ATTACH messages requesting provision of consistent service availability information to all of the cells for one or more multicast services available in the registration area in which the user terminal in the URA_PCH state is present; and
   providing the consistent service availability information for the one or more multicast services from the all drift radio network controllers to all of the cells of the registration area by using the ATTACH messages, the consistent service availability information being provided to all of the cells for indicating whether each of the one or more multicast services are available.

2. The method according to claim 1, wherein the serving radio network controller transmits the ATTACH messages when
   i) a first user terminal interested in at least one of the multicast service and a broadcast service enters the registration area in the URA_PCH state; or
   ii) a last user terminal interested in at least one of the multicast service and a broadcast service leaves the registration area in the URA_PCH state.

3. A method of providing information related to at least one multicast service in a mobile telecommunications network, the method comprising:
   checking, by a serving network controller, whether at least one user terminal has joined the at least one multicast service in a CELL Paging Channel (PCH) state;
   requesting, by the serving network controller, a drift radio network controller to store information related to the at least one multicast service;
   wherein the information is stored in the drift radio network controller while the at least one user terminal has joined the at least one multicast service,
   wherein the drift radio network controller maintains a user terminal specific context for the at least one user terminal while the at least one user terminal has joined the at least one multicast service, and
   wherein the user terminal specific context includes a record of the at least one multicast service joined by the at least one user terminal.

4. A method of providing a multicast service in a mobile telecommunications network, wherein the method comprising:
   acquiring first and second probability factors, wherein the first probability factor is different from the second probability factor;
   counting of user terminals in Radio Resource Control (RRC) idle state and user terminals in URA Paging Channel (PCH) state using the first and second probability factors, respectively, the user terminals being interested in a particular multicast service;
   transmitting ATTACH messages from a serving radio network controller to all drift radio network controllers having cells in a registration area in which the user terminal in the URA_PCH state is present, the ATTACH messages requesting provision of consistent service availability information to all of the cells for the particular multicast service; and
   providing the consistent service availability information for the particular multicast service from the radio network controllers to all cells of the registration area by using the ATTACH messages, the consistent service availability information being provided to all of the cells for indicating whether the particular multicast service is available.

5. A method of providing a multicast service in a mobile telecommunications network, the method comprising:
   acquiring a probability factor and an additional parameter for determining whether the probability factor is applicable to user terminals in a state indicated by the additional parameter;
   counting user terminals interested in a particular multicast service using the probability factor and the additional parameter, wherein counting of user terminals is performed when the user terminals are in Radio Resource Control (RRC) idle state and URA Paging Channel (PCH) state respectively;
   transmitting ATTACH messages from a serving radio network controller to all drift radio network controllers having cells in a registration area in which the user terminal in the URA_PCH state is present, the ATTACH messages requesting provision of consistent service availability information to all of the cells for the particular multicast service; and
   providing the consistent service availability information for the particular multicast service from the all drift radio network controllers to all of the cells of the registration area by using the ATTACH messages, the consistent service availability information being provided to all of the cells for indicating whether the particular multicast service is available.

6. The method according to claim 5, wherein the additional parameter determines whether the probability factor is applicable as follows:
   user terminals in a state corresponding to a higher activity level respond to counting irrespective of the probability factor.

* * * * *